United States Patent
Elahee (10) Patent No.: US 7,313,719 B1
(45) Date of Patent: Dec. 25, 2007

(54) RESTORE OF BACKUP TO COMPUTER SYSTEM WITH FILESYSTEM/VOLUME ATTRIBUTE MODIFICATION

(75) Inventor: Shawn L. Elahee, Schertz, TX (US)

(73) Assignee: Symantec Operating Corporation, Mountain View, CA (US)

( * ) Notice: Subject to any disclaimer, the term of this patent is extended or adjusted under 35 U.S.C. 154(b) by 347 days.

(21) Appl. No.: 10/774,033

(22) Filed: Feb. 6, 2004

(51) Int. Cl.
*G06F 12/16* (2006.01)

(52) U.S. Cl. ............ 714/6; 714/5; 714/8; 714/15; 711/114; 711/162

(58) Field of Classification Search .......... None
See application file for complete search history.

(56) References Cited

U.S. PATENT DOCUMENTS

| | | | |
|---|---|---|---|
| 5,598,563 A | 1/1997 | Spies | |
| 5,708,604 A | 1/1998 | Fontana et al. | |
| 5,708,654 A | 1/1998 | Arndt et al. | |
| 5,715,456 A | 2/1998 | Bennett et al. | |
| 5,732,282 A | 3/1998 | Provino et al. | |
| 5,802,365 A | 9/1998 | Kathail et al. | |
| 5,890,204 A | 3/1999 | Ofer et al. | |
| 6,078,990 A | 6/2000 | Frazier | |
| 6,170,055 B1 | 1/2001 | Meyer et al. | |
| 6,185,686 B1 | 2/2001 | Glover | |
| 6,729,011 B2 | 8/2001 | Muhlestein | |
| 6,346,954 B1 | 2/2002 | Chu et al. | |
| 6,535,998 B1 | 3/2003 | Cabrera et al. | |
| 6,640,291 B2 | 10/2003 | Fujibayashi et al. | |
| 6,654,830 B1 | 11/2003 | Taylor et al. | |
| 6,681,323 B1 | 1/2004 | Fontanesi et al. | |
| 6,725,715 B2 | 4/2004 | Igarashi et al. | |
| 6,735,715 B1 | 5/2004 | Graham | |
| 6,748,429 B1 * | 6/2004 | Talluri et al. | 709/221 |
| 6,760,787 B2 * | 7/2004 | Forin | 710/18 |
| 6,820,035 B1 | 11/2004 | Zahavi | |
| 6,836,830 B1 * | 12/2004 | Yamagami et al. | 711/162 |
| 7,107,534 B1 | 9/2006 | de Jong et al. | |
| 2002/0016792 A1 * | 2/2002 | Ito et al. | 707/200 |
| 2002/0019908 A1 | 2/2002 | Reuter et al. | |
| 2003/0028725 A1 * | 2/2003 | Naberhuis et al. | 711/114 |
| 2003/0074527 A1 | 4/2003 | Burton et al. | |
| 2003/0159070 A1 | 8/2003 | Mayer et al. | |
| 2003/0195995 A1 | 10/2003 | Tabbara | |

(Continued)

OTHER PUBLICATIONS

"Automated System Recovery with VERITAS Netbackup™," VERITAS Bare Metal Restore, White Paper, VERITAS Software Corp. 2002, pp. 1-10.
"PowerQuest Drive Image 7.0," User Guide, May 2003 PowerQuest Corp., pp. 43-63.

(Continued)

*Primary Examiner*—B. James Peikari
(74) *Attorney, Agent, or Firm*—Lawrence J. Merkel; Meyertons, Hood, Kivlin, Kowert & Goetzel, P.C.

(57) ABSTRACT

In some embodiments, a computer accessible medium comprises a plurality of instructions. When executed, the plurality of instructions modify at least a first attribute corresponding to a first volume, the first volume corresponding to a computer system's backup state. Subsequent to modifying the first attribute, the plurality of instructions, when executed, cause the first volume to be created on a first computer system to which the computer system's backup state is to be restored.

33 Claims, 4 Drawing Sheets

U.S. PATENT DOCUMENTS

2004/0091175 A1    5/2004   Fadi
2004/0111250 A1    6/2004   Hensley
2004/0172512 A1*   9/2004   Nakanishi et al. .......... 711/162
2004/0205310 A1*  10/2004   Yamagami ................. 711/162

OTHER PUBLICATIONS

"Drive Image 2002," PowerQuest Corp. 2002, 2 pages.
"VERITAS Backup Exec™0.1 for Windows Servers," Intelligent Disaster Recovery™ Option, White Paper, VERITAS Software Corp. 2002, pp. 1-9.

* cited by examiner

RESTORE OF BACKUP TO COMPUTER SYSTEM WITH FILESYSTEM/VOLUME ATTRIBUTE MODIFICATION

BACKGROUND OF THE INVENTION

1. Field of the Invention

This invention is related to the field of computer system backup/restore software.

2. Description of the Related Art

Various software tools existing for backing up computer systems and restoring backup data to computer systems. Such tools are provided to permit recovery, at least to the most recent backup state, from user error, hardware failure in the backed-up computer system, or other disaster situations originating outside the computer system that cause data loss such as by damaging the computer system. User error may include activities such as accidental file deletion, file corruption, or erroneous file content change.

In some cases, such as certain user errors, only the affected files need be restored to the computer system. In other cases, such as hardware failure or other disaster, the entire backup state is restored to the computer system after the failure is corrected. The failure may be corrected by replacing the faulty hardware in the same computer system. In other cases, the entire computer system may be replaced. The computer system may be replaced because the faulty hardware cannot be replaced or repaired, or because it is more cost-effective to purchase a new computer system than to attempt repair of the failing computer system.

Whether hardware is replaced or the entire computer system is replaced, in some cases it is not possible to provide the same disk configuration. Over time, the readily-available fixed disk drives (or "hard" disk drives) change. For example, the capacity (or "size") of the disk drives tends to increase over time. Thus, if disk drives are being replaced in a computer system, it is likely that higher capacity disk drives will be used as compared to those being replaced. If a new computer system is being deployed, the new computer system will probably include higher capacity disk drives than the computer system being replaced. Particularly, it is common to have fewer drives of higher capacity.

When the disk configuration (i.e., number and capacity of disk drives) is not the same between a backed-up computer system (that is, a computer system from which a backup was made) and the restore computer system (that is, the computer system to which the backup is being restored), restoration of the backup is problematic. For example, if the number of disk drives is the same between the configurations, but the new configuration has more total capacity, then space may be wasted on the new configuration due to some of the space being unallocated.

Furthermore, the storage in the original disk configuration is typically divided into various volumes onto which filesystems are mapped. Volumes may be mapped to a single disk drive or multiple disk drives. Multiple disk drives may be combined into a volume as a single logical storage. In other cases, a volume may have protection/performance attributes such as mirroring, redundant array of inexpensive disks (RAID) configurations, or striping. Such performance/protection attributes are implemented by mapping the volume to multiple disk drives. Furthermore, various filesystems may have various sizes based on the original disk configuration. If the disk configuration in the restore computer system differs from the original disk configuration, how to map volumes and filesystems to the new disk configuration may not be immediately apparent.

Some restoration tools will permit the new disk drives to be higher capacity in the restore computer system as long as the same number of disk drives are included. Such tools, during the restoration, expand the size of volumes on a given disk drive in proportion to the size difference. However, such tools are limited to use when the same number of disks are provided and are limited in flexibility. Other tools, such as the VERITAS Bare Metal Restore™ (BMR) product (version 4.5) available from VERITAS Software Corporation (Mountain View, Calif.) permit the user to map the volumes to a new configuration or exclude volumes from a restore, but do not permit the volume attributes to be changed. Still other tools (such as the Intelligent Disaster Recovery Option™ (IDR) of the VERITAS Backup Exec™ product available from VERITAS Software Corporation for the Windows platform) create the volumes on the restore system, then launch Microsoft's disk administration utility to permit changing various volume attributes (except for the system partition that includes the operating system software). These tools are also limited since the system partition cannot be modified. Additionally, these tools are limited in that the volume must be created on the restore computer system before it can be modified. Some volumes may not be successfully created. For example, volumes that are mapped to more than one disk drive may not be successfully created if only one disk drive is included in the restore system (e.g. striped or mirrored volumes). Finally, an administrator may manually create volumes and restore data manually. However, such a mechanism may be time consuming (both for the administrator and any users awaiting the restore) and may increase the likelihood of error.

SUMMARY OF THE INVENTION

In some embodiments, a computer accessible medium comprises a plurality of instructions. When executed, the plurality of instructions modify at least a first attribute corresponding to a first volume, the first volume corresponding to a computer system's backup state. Subsequent to modifying the first attribute, the plurality of instructions, when executed, cause the first volume to be created on a first computer system to which the computer system's backup state is to be restored.

In other embodiments, a method is contemplated. At least a first attribute corresponding to a first volume is modified. The first volume corresponds to a computer system's backup state. Subsequent to the modifying, a restore of the computer system's backup state is initiated to a first computer system. The backup state includes the first volume with the modified first attribute. The restore comprises creating the first volume on the first computer system.

In some implementations, a system comprises a first computer system and a second computer system. The first computer system is configured to modify at least a first attribute of a first volume corresponding to a computer system's backup state. Additionally, the first computer system is configured to subsequently initiate a restore of the computer system's backup state, including the first volume with the modified first attribute. The second computer system is the system on which the computer system's backup state is to be restored.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
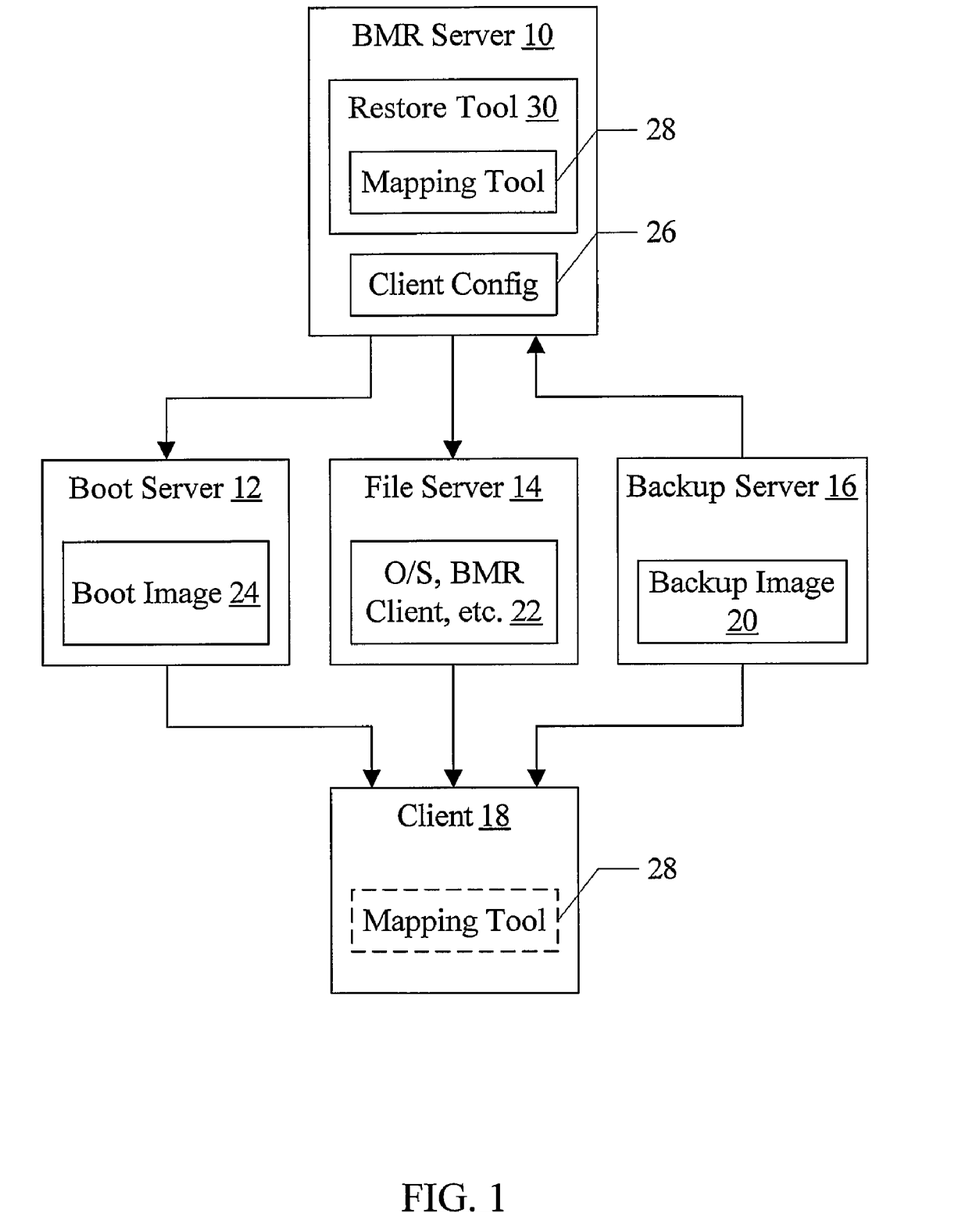
FIG. 1 is a block diagram of a system including several servers and a client.

Turning now to FIG. 1, a block diagram of one embodiment of a system comprising several servers and a client is shown. In the illustrated embodiment, a bare metal restore (BMR) server 10, a boot server 12, a file server 14, a backup server 16, and a client 18 are shown. The BMR server 10 is coupled to the boot server 12, the file server 14 and the backup server 16. The BMR server 10 may also be coupled to the client 18, in some embodiments. The client 18 is coupled to the boot server 12, the file server 14 and the backup server 16. FIG. 1 is illustrative of logical relationships between the servers and client. Physical connection may be established in any desired fashion (e.g. any type of network, combinations of networks, shared memory, etc.).

The client 18 comprises a computer system that may be restored using the servers 10, 12, 14, and 16. That is, the data to be stored on the client 18 is backed-up in a backup image 20 on the backup server 16. The data may have been backed up from the client 18 previously, and may be restored due to a failure in the client 18 (either hardware, software, or a combination thereof) or other loss of the data in the client 18. Alternatively, the data may have been backed up from another computer system (not shown) that subsequently experienced an irreparable failure or is otherwise being replaced by the client 18. The backup server 16 may implement any backup solution (e.g. the VERITAS Net-Backup™ product from VERITAS Software Corporation, or any other VERITAS backup product or backup product from any other vendor).

At the time the backup is performed, a record is made of the system configuration. The record is illustrated as the client configuration file 26 on the BMR server 10 in FIG. 1, although the record may be stored in any form. In some embodiments, the client configuration file 26 may be part of the backup image 20 as well, or the client configuration file 26 may be stored only as part of the backup image 20 and may be retrieved by the BMR server 10 when a client restore is to be performed. The record may be created by BMR software (e.g. either the client software executing on the client being backed up, or by the server software on the BMR server 10). The term "backup state" may be used herein to refer to the state saved from a computer system when a backup operation is performed on the computer system. The backup state may include the backup image (that is, the data backed-up from the computer system). The backup state may also include the client configuration file 26, in this embodiment. Any other state created with the backed-up data and stored for use if a restore of the backed-up data or a portion thereof is performed may be included in the backup state, in various embodiments.

The client configuration file 26 stores various information describing the client system configuration. For example, the system configuration may include the number, type, and size of storage devices in the client system. The system configuration may further include an identification of the volumes on the storage devices, including the layout of volumes on the storage devices and the attributes of the volumes. Other system configuration data may include the number and type of processors, the amount of memory, and information on other peripheral devices such as network interface hardware, printer hardware, user interface devices, etc.

The file server 14 may provide the client 18 with various software (reference numeral 22) used during the restore process, which may include the operating system software (e.g. operating system commands and libraries), BMR client software, backup client software, etc. The file server 14 may implement any file system usable over a network (e.g. network file system (NFS), Server Message Block (SMB) for Microsoft Windows™ or Session Message Block (SAMBA) for Unix-like implementations, etc.). The boot server 12 may be used to provide a boot image 24 to the client 18. When the client 18 is booted to perform a restore, the client 18 may use standard network boot protocols to boot using the boot image 24. The boot image 24 may include a customized boot procedure created by a restore tool 30 on the BMR server 10, to restore the client 18 to the state corresponding to the backup image 20 (including the data in the backup image 20, along with the configuration of the computer system at the time of the backup). In some embodiments, a media boot is supported in which the boot image 24 and software 22 are stored on a computer accessible medium such as a compact disc, and the disc is used to boot the client 18. In such embodiments, the boot server 12 and the file server 14 may be eliminated.

In one embodiment, each of the BMR server 10, the boot server 12, the file server 14, and the backup server 16 comprise computer systems configured to execute the corresponding server software. In some embodiments, one or more of the servers 10, 12, 14, and 16 may be combined onto the same physical computer system, as desired.

As part of the customized boot procedure, the configuration of the client's storage subsystem is restored. As mentioned above, in some cases, the client 18 may have a different set of storage devices then that indicated in the client configuration file 26. For example, different sets of storage devices may be encountered if the client 18 is a different physical computer system than the computer system that was backed-up to create the backup image 20, or if a storage device or devices are replaced with different devices. The restore tool 30 may permit the restoration to the different configuration. In the illustrated embodiment, the restore tool 30 includes a mapping tool 28 to allow the user to map the volumes and filesystems identified in the client configuration file 26 to the storage devices included in the client 18. Additionally, the mapping tool 28 may permit various attributes of the volumes/filesystems to be changed by the user. In some embodiments, the mapping tool 28 may execute on the BMR server 10. In other embodiments, the mapping tool 28 may execute elsewhere (e.g. on the client 18, as illustrated in dotted form in FIG. 1).

In some embodiments, the user may be permitted to map volumes/filesystems to the client storage devices (and optionally change volume or filesystem attributes) prior to initiating the restore operation to the client 18. For example, the user may map volumes/filesystems to the client storage devices prior to the creation of the volumes on the client storage devices. In some such embodiments, the volume attributes/filesystem attributes may be changed so that the volumes/filesystems may be successfully created on the client storage devices for cases in which the volumes/filesystems with the original attributes may not be created on the client storage devices.

In some embodiments, the mapping tool 28 accepts user modifications to the volume/filesystem mappings to client storage devices and user modifications to the volume or filesystem attributes. The mapping tool 28 may modify the client configuration file 26 to reflect the changes in attributes/mappings. In other embodiments, a new client configuration file may be generated to reflect the changes. The modified client configuration file 26 or the new client configuration file may be used by the restore tool 30 to generate the customized boot procedure for the client 18. In still other embodiments, the modifications may be effected to any representation of the mapping of volumes/filesystems to storage devices and any representation of volume attributes. In some embodiments, the mapping tool 28 may provide automatic mapping of volumes/filesystems to client storage devices (along with modifications of volume/filesystem attributes) in addition to or instead of accepting user input to modify the mapping/attributes.

While the present embodiment restores the client 18 using a customized boot procedure, any restore mechanism for creating the volumes/filesystems (with potentially modified attributes) on the client 18 and for restoring the backup image 20 into the created volumes/filesystems may be used.

In some embodiments, the mapping tool 28 may provide a command line interface to permit the user to modify volume/filesystem attributes. Other embodiments may provide a graphical user interface (GUI). Still other embodiments may provide both a command line interface and a GUI. One embodiment of the GUI is described in more detail below.

As used herein, the term "volume" may refer to any defined amount of storage on one or more storage devices. The term volume may include, for example, logical volume as used in Unix-like operating systems such as Linux, AIX from IBM Corp., Solaris from Sun Microsystems, etc. The term volume may also include, for example, a volume and/or a volume set as define by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups. The term "filesystem" may generally refer to any system for managing the organization and tracking of files that are stored on the volumes.

Generally, volumes and filesystems may have any desired attributes in various embodiments. An attribute may generally refer to any property assigned to the volume or filesystem. For example, a volume may have a size attribute indicating the size of the volume, a volume type attribute, one or more performance and/or protection attributes. A filesystem may have a size attribute, and may also have type and performance/protection attributes in some embodiments.

The volume type attribute definition may vary from operating system to operating system. For example, there are many brands of "Unix-like" operating systems (i.e. operating systems generally developed to the Unix model). In IBM's AIX, volume types may include a journaled filesystem (JFS) and a virtual file system (VFS) type. In Hewlett-Packard's HP-UX and Sun's Solaris implementations of Unix, volume types may include boot, swap, root, etc. In Linux, volume types may include boot and swap. In the Windows operating system, volume types may include primary partitions, extended partitions, and other volumes.

Performance attributes may include any attributes that affect the performance of the volume or filesystem. For example, performance attributes may affect the latency of data access on the volume/filesystem, the bandwidth available for data access, etc. In some embodiments, the performance attributes may include whether or not the volume/filesystem is striped across two or more storage devices.

Protection attributes may include any attributes that affect the fault-tolerance of data on the volume/filesystem. For example, the protection attributes may include whether or not a volume/filesystem is mirrored (protecting against the failure of one of the storage devices to which data is mirrored). The protection attributes may include various RAID levels that may be used on a volume or filesystem.

Permitting the modification of volume/filesystem attributes may provide the user with flexibility in restoring data to the client 18. For example, the user may increase or decrease the size of a volume or filesystem to fit on the storage devices included in the client 18. The user may modify performance/protection attributes to fit on the storage devices as well. For example, if mirroring or striping of a volume is enabled and there are not enough storage devices to support the mirroring or striping, the mirroring or striping may be disabled. Similarly, the RAID level may be modified. On the other hand, the user may also modify protection/performance attributes to increase performance and/or protection, if the client storage devices permit. For example, striping or mirroring may be enabled, or the RAID level may be increased.

As mentioned above, in some embodiments, the mapping tool 28 may include a GUI for making volume/filesystem changes. In one embodiment, the GUI may include a graphical display of the storage system configuration from the backed-up system (referred to as the "original configuration") and a storage system configuration developed by the user (referred to as the "new configuration"). Both the original configuration and the new configuration may be visible to the user. For example, the original configuration and the new configuration may be displayed in separate panels within the same window. Alternatively, the original configuration and the new configuration may be displayed in separate windows, which may be moved, resized, etc. separately and which may be permitted to overlap each other on the display screen. Additionally, the GUI may also include one or more mechanisms for capturing data from the original configuration and inserting the data in the new configuration. Various capturing mechanisms may be supported. For example, the mapping tool 28 may support one or more of a "drag and drop" mechanism, a "copy and paste" mechanism, the launch of a "wizard" to guide the user through a set of steps to accomplish the capture and insert, etc.

As used herein, a storage device may include any sort of computer storage media such as, for example, fixed or removable disk drives, external disk drives (including solid state drives that comprise non-volatile memory such as Flash memory) coupled via a peripheral interface, tape drives, etc.

Figure 2:
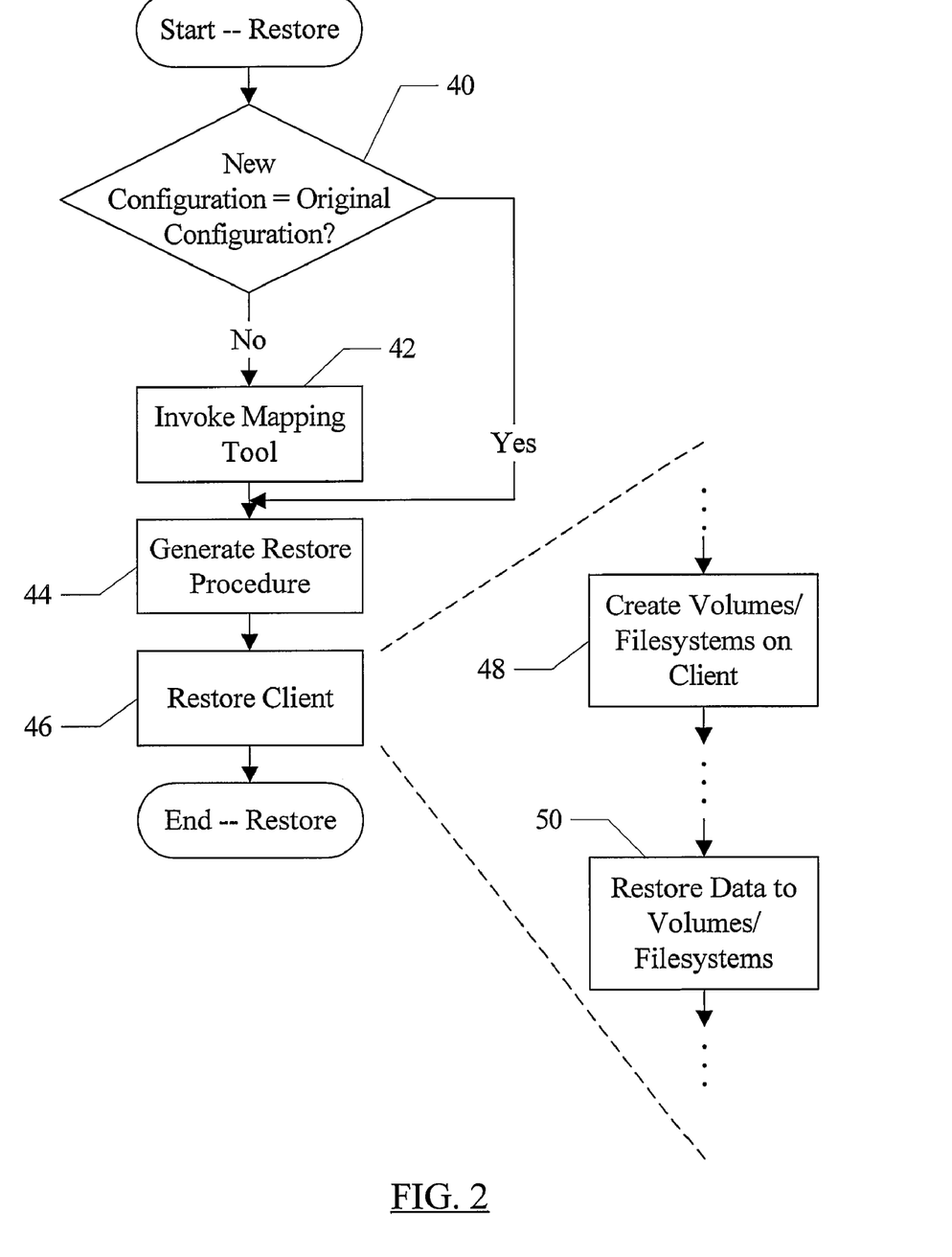
FIG. 2 is a flowchart illustrating operation during one embodiment of a restore operation.

Turning next to FIG. 2, a flowchart is shown illustrating operation during a restore, including operation of one embodiment of the restore tool 30. In some embodiments, the restore tool 30 is implemented in software. In such embodiments, the restore tool 30 may include a plurality of instructions which, when executed, implement the operation assigned to the restore tool 30 in the flowchart of FIG. 2.

Figure 3:
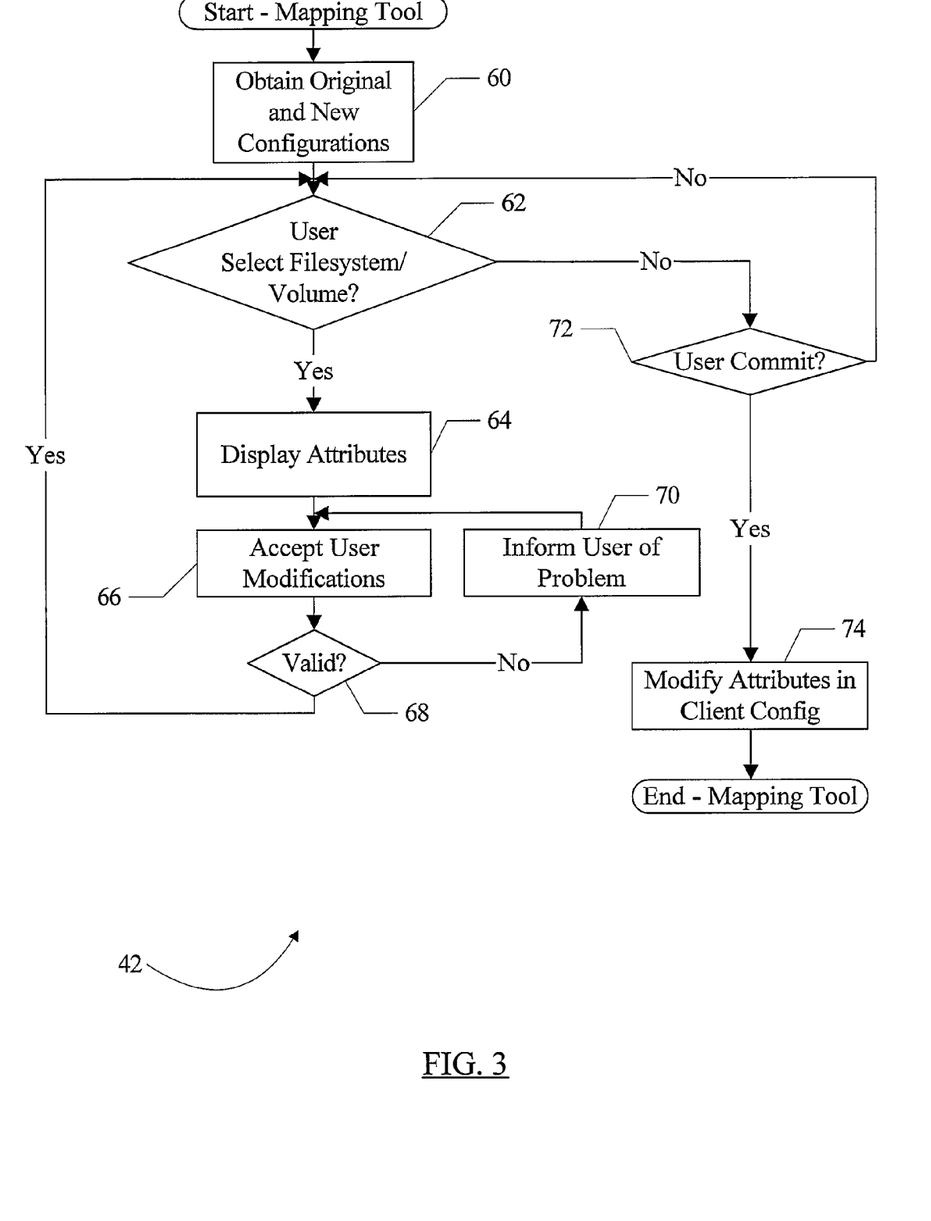
FIG. 3 is a flowchart illustrating operation of one embodiment of a mapping tool.

The restore tool 30 may determine if the new configuration (of the client 18) is the same as the original configuration (corresponding to the backup state that is to be restored). For purposes of this disclosure, the restore tool 30 may determine that the new configuration and the original configuration are the same if the storage configuration is the same (e.g. same number, type, and size of storage devices). In other embodiments, additional checks may be made to determine if the new configuration and the original configuration are the same, as desired. If the new configuration is the same as the original configuration (decision block 40, "yes" leg), mapping of the volumes and filesystems may not be needed and the mapping tool may not be invoked. That is, if the new configuration and the original configuration are the same, the client configuration file 26 may be used as-is to restore the client 18. If the new configuration differs from the original configuration (decision block 40, "no" leg), the mapping tool may be invoked to map the volumes/filesystems to the client 18 (block 42). Operation of one embodiment of block 42 is shown in FIG. 3 and described in more detail below.

The restore tool 30 may generate the restore procedure for the client 18 (e.g. part of the boot image 24, in the embodiment of FIG. 1) using the client configuration file 26 (as modified by the mapping tool 28, if the new configuration and the original configuration are not the same) (block 44). The client may then be restored (block 46). Restoration of the client 46 may occur, in this embodiment, by the client 18 booting and executing the boot image 24.

Block 46 is shown in exploded view in FIG. 2. Among other things, restoring the client 18 may include creating the volumes on the client, and creating the filesystems on the volumes (block 48). Any modifications made by the mapping tool 28 to the volume attributes and/or filesystem attributes are reflected in the created volumes/filesystems. Subsequently, the data from the backup image 20 is restored to the volumes/filesystems created in block 48 (block 50). Other operations may intervene between blocks 48 and 50, in various embodiments, as desired.

It is noted that, while FIG. 2 illustrates invoking the mapping tool 28 in response to detecting dissimilar configurations, a user may also be permitted to invoke the mapping tool 28 directly. For example, if the new configuration includes more storage than the original configuration, the user may wish to increase the performance/protection of various volumes and/or filesystems by modifying various attributes.

Turning now to FIG. 3, a flowchart is shown illustrating operation of one embodiment of the mapping tool 28 (block 42 in FIG. 2). In some embodiments, the mapping tool 28 is implemented in software. In such embodiments, the mapping tool 28 may include a plurality of instructions which, when executed, implement the operation assigned to the mapping tool 28 in the flowchart of FIG. 3.

The mapping tool 28 may obtain the original and new configurations (block 60). For example, in the illustrated embodiment, the original configuration may be defined in the client configuration file 26. The new configuration may be obtained from the client 18. In some embodiments, the mapping tool 28 may be supplied with a configuration file similar to the client configuration file 26 that describes the storage devices in the client 18 (e.g. type and size). In other embodiments, the mapping tool 28 may perform a discovery process on the client 18 or may cause a discovery process to be performed, and may receive the results. The discovery process may identify the hardware in the client 18, including various storage devices. In some embodiments, the discovery process may include a discovery boot.

The mapping tool 28 may permit the user to drag and drop volumes into the new configuration as desired (not shown in FIG. 3). Additionally, the mapping tool 28 may permit the user to modify various attributes of the volume (or a filesystem thereon). If the user selects a volume or filesystem (decision block 62, "yes" leg), the mapping tool 28 may display the attributes of the volume/filesystem (block 64). The mapping tool 28 may accept any user modifications to the attributes (block 66).

In some embodiments, the mapping tool 28 may provide at least some validation checking on the modifications (decision block 68). For example, the mapping tool 28 may verify that the mapping of volumes to storage devices in the new configuration meets any operating-system specific requirements (if any), that the mapping of volumes to storage devices does not exceed the storage capacity on the storage devices, that the mapping of a volume to two or more storage devices (if any) meets any requirements for such mappings, and/or that any changes to the volume implemented by the user as part of inserting the volume into the new configuration are permissible. An example of operating-system specific requirements, in clients using the Microsoft Windows™ operating system, may include a requirement that partitions and other types of volumes are not mixed on the same storage device and a requirement that a maximum of 4 primary partitions are included on the same storage device. An example of verifying mapping of a volume to two or more storage devices may include, for a striped volume, that each stripe is mapped to a different physical storage device. Similar constraints may exist for mirrored volumes or RAID volumes, in some embodiments. An example of verifying the changes to the volume may include, if a user reduces the size of the volume, that the reduced size is not smaller than the amount of data actually stored in the volume. Any set of validation checking may be implemented in various embodiments. For example, some validation checking may be delayed until the user commits the changes (not shown in FIG. 3). Additionally, not all validation checking may be performed in response to accepting user input. In some embodiments, no validation checking may be performed.

If the validation checking detects an invalid modification (decision block 68, "no" leg), the mapping tool 28 may inform the user of the problem (block 70) and may return to accept more user input (to correct the problem—block 66). If the validation checking detects valid modifications (decision block 68, "yes" leg), the mapping tool 28 may await the selection of another volume or filesystem (decision block 62).

The user may select as many volumes/filesystems as desired and may modify various attributes as described above for blocks 62, 64, 66, 68, and 70. At some point, the user finishes and may indicate that the configuration is complete and ready to be committed (decision block 72). In the present embodiment, the user may enter modification via the GUI and may view the proposed modifications and their effect on the new configuration. Once the modifications are complete, the modifications may be committed to the new client configuration and the restore on the client 18 may be started. If the user commits the modifications (decision block 72, "yes" leg), the mapping tool 28 may update the client configuration file (or generate a new configuration file) and exit (e.g. to block 44 in FIG. 2) (block 74).

The embodiment of FIG. 3 provides an interactive user interface for accepting user input. For example, the embodiment of FIG. 3 may be used as part of a GUI implementation of the mapping tool 28. There may also be command line implementations of the mapping tool 28. For example, the command line implementation may include accepting user modifications (block 66), validating them (decision block 68), and either displaying an error (block 70) or implementing the requested modification in the client configuration file if no error is detected. In some embodiments, the command line interface may permit changes to be created followed by a commit of the changes, similar to the flowchart of FIG. 3.

Figure 4:
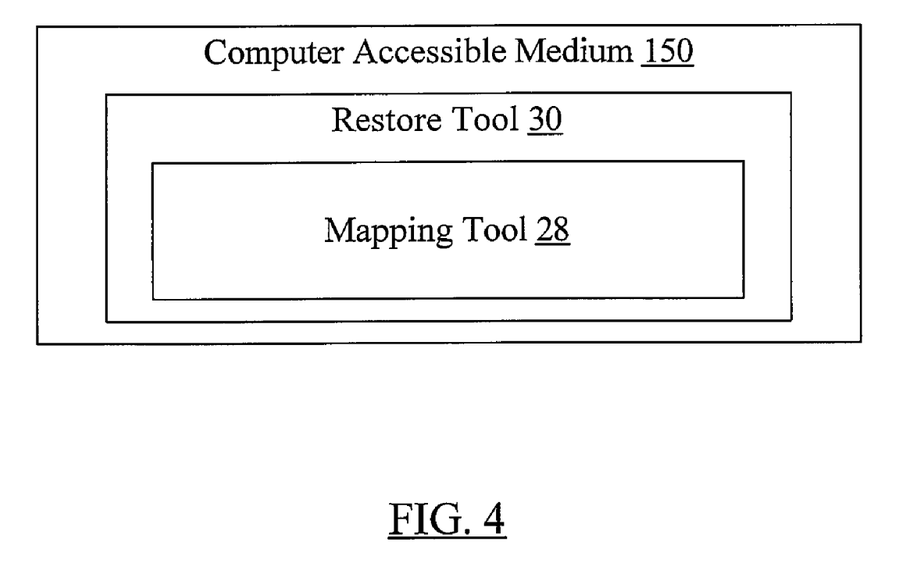
FIG. 4 is a block diagram of one embodiment of a computer accessible medium.

Turning now to FIG. 4, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 150 in FIG. 4 may be encoded with the restore tool 30 (including the mapping tool 28). The restore tool 30 and/or the mapping tool 28 may comprise instructions which, when executed, implement the functionality described herein for the software. Generally, the computer accessible medium 150 may store any set of instructions which, when executed, implement a portion or all of the flowcharts shown in one or more of FIGS. 2-3. In some embodiments, a computer accessible medium similar to the computer accessible medium 150 may be included in a client 18 and/or the BMR server 10.

Numerous variations and modifications will become apparent to those skilled in the art once the above disclosure is fully appreciated. It is intended that the following claims be interpreted to embrace all such variations and modifications.

What is claimed is:

1. A computer accessible storage medium comprising a plurality of instructions which, when executed:
   modify at least a first attribute corresponding to a first volume, the first volume corresponding to a client computer system's backup state, wherein the client computer system's backup state was previously saved in a backup operation, and wherein the first attribute is modified in the client computer system's backup state subsequent to the backup operation; and
   subsequent to modifying the first attribute, cause the first volume with the modified first attribute to be created on a first computer system as part of a restore of the client computer system's backup state to the first computer system.

2. The computer accessible storage medium as recited in claim 1 wherein the plurality of instructions, when executed, modify the first attribute responsive to user input.

3. The computer accessible storage medium as recited in claim 1 wherein the first attribute comprises a protection attribute.

4. The computer accessible storage medium as recited in claim 3 wherein the protection attribute comprises a redundant array of inexpensive disks (RAID) level.

5. The computer accessible storage medium as recited in claim 3 wherein the protection attribute comprises whether or not the first volume is mirrored.

6. The computer accessible storage medium as recited in claim 1 wherein the first attribute comprises a performance attribute.

7. The computer accessible storage medium as recited in claim 6 wherein the performance attribute comprises whether or not the first volume is striped.

8. The computer accessible storage medium as recited in claim 1 wherein the first attribute comprises a size of the first volume.

9. The computer accessible storage medium as recited in claim 8 wherein modifying the first attribute comprises reducing the size.

10. The computer accessible storage medium as recited in claim 8 wherein modifying the first attribute comprises increasing the size.

11. The computer accessible storage medium as recited in claim 1 wherein the first attribute comprises a type of the first volume, and wherein modifying the first attribute comprises changing the type.

12. The computer accessible storage medium as recited in claim 1 wherein the plurality of instructions, when executed, modify a second attribute corresponding to a first filesystem corresponding to the client computer system's backup state.

13. The computer accessible storage medium as recited in claim 1 wherein the client computer system's backup state comprises a configuration file, and wherein the configuration file comprises data describing the first volume and the first attribute, and wherein modifying the first attribute comprises changing the configuration file.

14. The computer accessible storage medium as recited in claim 13 wherein causing the first volume to be created comprises generating a restore procedure that the first computer system executes.

15. The computer accessible storage medium as recited in claim 1 wherein the first volume is created as part of a restore of the backup state to the first computer system.

16. The computer accessible storage medium as recited in claim 1 wherein the first computer system is the client computer system.

17. The computer accessible storage medium as recited in claim 1 wherein the first computer system is a different computer system from the client computer system.

18. A method comprising:
   modifying at least a first attribute corresponding to a first volume, the first volume corresponding to a client computer system's backup state, wherein the client computer system's backup state was previously saved in a backup operation, and wherein the modifying is performed in the client computer system's backup state subsequent to the backup operation; and
   subsequent to the modifying, initiating a restore of the client computer system's backup state, including the first volume with the modified first attribute, to a first computer system, wherein the restore comprises creating the first volume on the first computer system.

19. The method as recited in claim 18 further comprising accepting user input specifying the modification to the first attribute.

20. The method as recited in claim 18 wherein the first attribute comprises a protection attribute.

21. The method as recited in claim 20 wherein the protection attribute comprises a redundant array of inexpensive disks (RAID) level.

22. The method as recited in claim 20 wherein the protection attribute comprises whether or not the first volume is mirrored.

23. The method as recited in claim 18 wherein the first attribute comprises a performance attribute.

24. The method as recited in claim 23 wherein the performance attribute comprises whether or not the first volume is striped.

25. The method as recited in claim 18 wherein the first attribute comprises a size of the first volume.

26. The method as recited in claim 25 wherein modifying the first attribute comprises reducing the size.

27. The method as recited in claim 25 wherein modifying the first attribute comprises increasing the size.

28. The method as recited in claim 18 wherein the first attribute comprises a type of the first volume, and wherein modifying the first attribute comprises changing the type.

29. The method as recited in claim 18 wherein the first computer system is the client computer system.

30. The method as recited in claim 18 wherein the first computer system is a different computer system from the client computer system.

31. A system comprising:

a first computer system comprising a first computer accessible storage medium storing a plurality of instructions which when executed, modify at least a first attribute of a first volume corresponding to a client computer system's backup state, wherein the client computer system's backup state was previously saved in a backup operation, and wherein the first attribute is modified in the client computer system's backup state subsequent to the backup operation, and wherein the instructions when executed, subsequently initiate a restore of the client computer system's backup state, including the first volume with the modified first attribute; and a second computer system comprising a second computer accessible storage medium on which the client computer system's backup state is to be restored.

32. The system as recited in claim 31 wherein the second computer system is the client computer system.

33. The method as recited in claim 31 wherein the second computer system is a different computer system from the client computer system.

* * * * *